(12) United States Patent
Sakuma et al.

(10) Patent No.: US 7,917,572 B2
(45) Date of Patent: Mar. 29, 2011

(54) MUSIC COMPOSITION DATA TRANSMISSION RECORDING METHOD AND MUSIC COMPOSITION REPRODUCTION DEVICE

(75) Inventors: Kazushi Sakuma, Chiba (JP); Hideko Kimura, Chiba (JP)

(73) Assignee: Sony Corporation, Tokyo (JP)

( * ) Notice: Subject to any disclaimer, the term of this patent is extended or adjusted under 35 U.S.C. 154(b) by 1337 days.

(21) Appl. No.: 10/550,064

(22) PCT Filed: Mar. 19, 2004

(86) PCT No.: PCT/JP2004/003770
§ 371 (c)(1),
(2), (4) Date: May 31, 2006

(87) PCT Pub. No.: WO2004/086356
PCT Pub. Date: Oct. 7, 2004

(65) Prior Publication Data
US 2006/0256669 A1    Nov. 16, 2006

(30) Foreign Application Priority Data

Mar. 26, 2003    (JP) .................................. 2003-084245

(51) Int. Cl.
G06F 15/16    (2006.01)
G06F 15/177    (2006.01)
H04B 1/20    (2006.01)
G11B 21/08    (2006.01)

(52) U.S. Cl. ............ 709/201; 709/208; 709/221; 369/2; 369/30.01; 369/30.14

(58) Field of Classification Search .................. 709/201, 709/203, 208, 224; 369/2, 30.01, 30.14
See application file for complete search history.

(56) References Cited

U.S. PATENT DOCUMENTS

| 5,454,723 | A  | * | 10/1995 | Horii ......................... 434/307 A |
| 5,959,684 | A  | * | 9/1999 | Tan et al. ...................... 348/515 |
| 7,421,434 | B2 | * | 9/2008 | Fujiwara .............................. 1/1 |
| 2003/0110320 | A1 | * | 6/2003 | Ono et al. ......................... 710/1 |
| 2004/0032680 | A1 | * | 2/2004 | Fujiwara ......................... 360/15 |

(Continued)

FOREIGN PATENT DOCUMENTS

JP    8-272864    10/1996

(Continued)

*Primary Examiner* — Shawki S Ismail
*Assistant Examiner* — Farzana Huq
(74) *Attorney, Agent, or Firm* — Oblon, Spivak, McClelland, Maier & Neustadt, L.L.P.

(57) ABSTRACT

A song in a music player is replaced by another song in a server in accordance with the user's estimated preferences and wishes and without requiring the user to become conscious of individual songs. A CPU (3) in the music player (30) or a CPU (11) in a server (10) detects or receives the size of a free space in a flash memory (34) and a playback history (a substantial playback count Kp, which denotes the number of times a song was continuously played for a duration not shorter than a predetermined one, or a skip count Ks, which denotes the number of times a song was played for a duration shorter than a predetermined one) of every song recording in the flash memory (34), and judges whether any song should be deleted from the flash memory (34) to permit a song to be downloaded into the music player (30) from the server (10). If any song should be deleted, the CPU selects a song having a small (minus) evaluation function K (e.g., K=2Kp−Ks) as the song to be deleted.

4 Claims, 7 Drawing Sheets

U.S. PATENT DOCUMENTS

2009/0217808 A1 * 9/2009 Rogers et al. .................... 89/1.8

FOREIGN PATENT DOCUMENTS

| | | |
|---|---|---|
| JP | 08-272864 | 10/1996 |
| JP | 10-133932 | 5/1998 |
| JP | 11-136365 | 5/1999 |
| JP | 2001-142855 | 5/2001 |
| JP | 2001-331601 | 11/2001 |
| JP | 2002-196778 | 7/2002 |
| JP | 2002-202785 | 7/2002 |
| JP | 2003-030966 | 1/2003 |
| JP | 2003-30966 | 1/2003 |
| JP | 2003-77214 | 3/2003 |
| JP | 2003-077214 | 3/2003 |
| JP | 2003-186754 | 7/2003 |

* cited by examiner

FIG. 2

| FILE IDEN-TIFICATION INFORMATION | SONG NAME | ARTIST NAME | LENGTH | SIZE | SERVER REGISTRATION DATE / TIME | MUSIC PLAYER REGISTRATION DATE / TIME | TRANSFER-TO-MUSIC-PLAYER COUNT |
|---|---|---|---|---|---|---|---|
| A | ... | ... | ... | ... | ... | ... | 1 |
| B | ... | ... | ... | ... | ... | ... | 3 |
| C | ... | ... | ... | ... | ... | ... | 1 |
| D | ... | ... | ... | ... | ... | ... | 1 |
| E | ... | ... | ... | ... | ... | ... | 1 |
| F | ... | ... | ... | ... | ... | | 1 |
| G | ... | ... | ... | ... | 2003:03:16:10:05:11 | | 1 |
| H | ... | ... | ... | ... | 2003:03:18:10:07:59 | | 0 |
| I | ... | ... | ... | ... | 2003:03:19:10:11:24 | | 0 |
| J | ... | ... | ... | ... | 2003:03:19:10:15:33 | | 0 |

FIG. 3

| FILE IDEN-TIFICATION INFORMATION | SONG NAME | ARTIST NAME | LENGTH | SIZE | DATE / TIME OF REGISTRATION FROM SERVER | SUBSTANTIAL PLAYBACK COUNT Kp | SKIP COUNT Ks | EVALUATION FUNCTION K |
|---|---|---|---|---|---|---|---|---|
| A | ... | ... | ... | ... | ... | 10 | 2 | 18 (14) |
| B | ... | ... | ... | ... | ... | 5 | 5 | 5 (-7) |
| C | ... | ... | ... | ... | ... | 2 | 10 | -6 (10) |
| D | ... | ... | ... | ... | ... | 1 | 2 | 0 (-4) |
| E | ... | ... | ... | ... | ... | 4 | 1 | 7 (3) |
| F | ... | ... | ... | ... | ... | 7 | 0 | 14 (10) |

$K = 2K_p - K_s$ $K = 2K_p - K_s - 4K_t$

MUSIC COMPOSITION DATA TRANSMISSION RECORDING METHOD AND MUSIC COMPOSITION REPRODUCTION DEVICE

TECHNICAL FIELD

The present invention relates to a music data transfer/recording method for use in a music recording/playback system that downloads song data from a PC (personal computer) or other server for storing song data on a hard disk or other storage device to a music player for playing song data stored in a flash memory or other storage section. The present invention also relates to a music player for such a system.

BACKGROUND ART

A small-size, portable music player that has a flash memory or other relatively small-sized memory and plays song data stored in the memory is now commercially available. The user of the music player connects the music player to a PC and downloads song data from the PC to the music player.

A music data download system disclosed by Patent Document 1 (Japanese Patent Laid-open No. 2002-108747) downloads song data, to which playback control information is added, from a server to a terminal. The terminal exercises song data playback control in accordance with the playback control information.

Further, the invention disclosed by Patent Document 2 (Japanese Patent Laid-open No. Hei 10-208445) furnishes an administration section, for instance, of a radio station with a shelf for storing media on which music data is recorded, playback means for playing back the music data from the media, and retention means for retaining the music data in such a manner as to transfer the music data at a high speed to a studio or other terminal section via a network. The shelf is used to store media on which infrequently used music data is recorded. The retention means is used to retain frequently used music data. In accordance with the frequency of music data use, this invention uses the shelf, playback means, or retention means to store or retain the media or music data.

However, the aforementioned small-size, portable music player having a flash memory or other relatively small-sized memory cannot retain hundreds or thousands of songs. Therefore, the user of the small-size, portable music player has to marshal song data as needed within the music player before downloading new song data or the song data deleted from the music player from a PC to the music player.

However, the user finds it troublesome to select the songs to be deleted from the music player or may be at a loss what songs to delete. The user also finds it troublesome to select the songs to be transferred from the PC to the music player. The greater the number of songs stored on the PC, the more often the user is at a loss what songs to transfer.

The present invention has been made to provide a natural method for replacing songs stored in the music player by the other songs stored in the server in accordance with the user's estimated preferences and wishes and without requiring the user to perform a special procedure, exercise judgment, or become conscious of individual songs.

DISCLOSURE OF INVENTION

According to a first aspect of the present invention, there is provided a music data transfer/recording method for transferring song data from a server, which retains song data in a storage device, to a music player, which plays back song data retained in a storage section, and writing the transferred song data in the storage section, the method including:

a first step for causing the server to select the song data to be transferred to the music player from among the song data that are retained in the storage device and not retained in the storage section;

a second step for causing the music player to judge whether the free space in the storage section is exceeded by the amount of song data to be transferred; and a third step for causing the music player, when the free space in the storage section is exceeded by the amount of song data to be transferred, to select the song data to be deleted from the storage section, delete the selected song data from the storage section, and write the song data transferred from the server into the storage section, wherein the first step causes the server to preferentially select song data that has not been transferred to the music player and has been most recently registered in the server, as the song data to be transferred to the music player; and wherein the third step causes the music player to reference a substantial playback count of each song data retained in the storage section, the substantial playback count denoting the number of times a song was continuously played for a duration not shorter than a predetermined one, or a skip count of each song data retained in the storage section, the skip count denoting the number of times a song was played for a duration shorter than a predetermined one, and preferentially select the song data having a low substantial playback count or the song data having a high skip count as the song data to be deleted from the storage section.

According to a second aspect of the present invention, there is provided a music data transfer/recording method for transferring song data from a server, which retains song data in a storage device, to a music player, which plays back song data retained in a storage section, and writing the transferred song data in the storage section, the method including:

a first step for transmitting a substantial playback count, which denotes the number of times a song was continuously played for a duration not shorter than a predetermined one, or a skip count, which denotes the number of times a song was played for a duration shorter than a predetermined one, from the music player to the server as a playback history of each song data retained in the storage section;

a second step for causing the server to select the song data to be transferred to the music player from among the song data that are retained in the storage device and not retained in the storage section, and to judge whether the free space in the storage section is exceeded by the amount of song data to be transferred;

a third step for causing the server, when the free space in the storage section is exceeded by the amount of song data to be transferred, to select the song data to be deleted from the storage section, specify the song data to be deleted, and transfer the song data targeted for a transfer to the music player; and a fourth step for causing the music player to delete the specified song data from the storage section and write the transferred song data into the storage section, wherein the second step causes the server to preferentially select song data that has not been transferred to the music player and has been most recently registered in the server, as the song data to be transferred to the music player; and wherein the third step causes the server to reference the playback history transmitted from the music player and preferentially select the song data having a low substantial playback count or the song data having a high skip count as the song data to be deleted from the storage section.

When the user mounts the music player on a cradle that is connected to the server or otherwise connects the music player to the server in a situation where the music data transfer/recording method according to the present invention, which has been described above, is used, the server selects the song data to be transferred from the server to the music player. If the free space of the storage section in the music player is exceeded by the amount of song data to be transferred, the music player or server selects the song data to be deleted from the storage section of the music player. Therefore, some songs in the music player are replaced by the other songs in the server without requiring the user to perform a special procedure, exercise judgment, or become conscious of individual songs.

Further, the music player or server preferentially selects songs having a low substantial playback count or a high skip count as the song data to be deleted from the music player. Therefore, songs that do not presumably match the user's preferences will be deleted from the music player, whereas songs that presumably match the user's preferences will be retained in the music player. Furthermore, the server preferentially selects a song that has not been transferred to the music player and has been most recently registered in the server, as the song data to be transferred to the music player. Consequently, a song that presumably matches the user's preferences will be loaded into the music player.

BRIEF DESCRIPTION OF DRAWINGS

FIG. 2 shows an example of file-attached information in a server.

FIG. 3 shows an example of file-attached information in a music player.

BEST MODE FOR CARRYING OUT THE INVENTION

Figure 1:
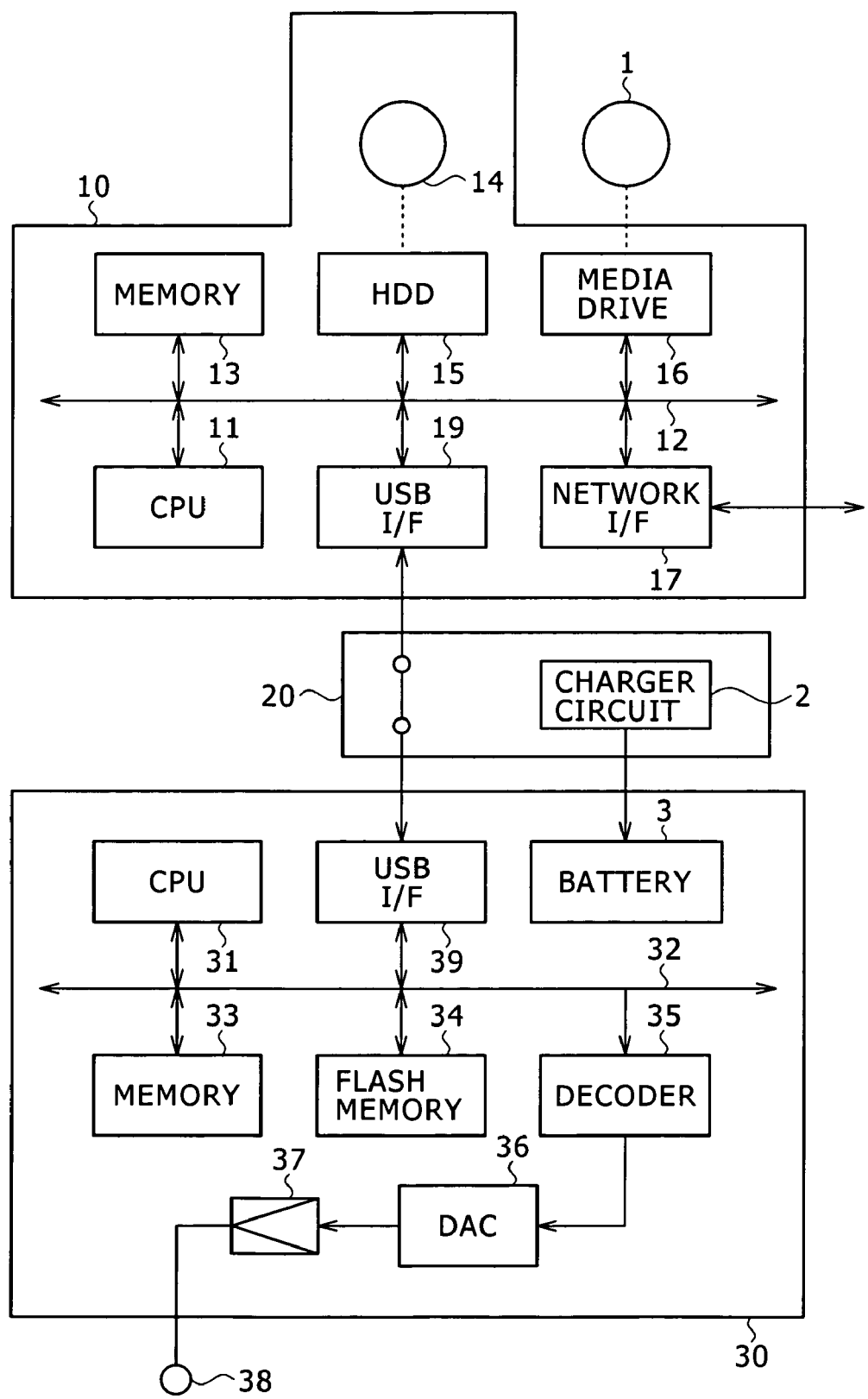
FIG. 1 illustrates one embodiment of a music recording/playback system in which a music data transfer/recording method according to the present invention is executed.

One Embodiment of a Music Recording/Playback System: FIGS. 1 to 3

FIG. 1 illustrates one embodiment of a music recording/playback system in which a music data transfer/recording method according to the present invention is executed.

The music recording/playback system according to the present embodiment comprises a server 10, which is a PC; a cradle 20, which is connected to the server 10; and a portable music player 30. When the music player 30 is mounted on the cradle 20, the music player 30 is connected to the server 10 and a charger circuit 2 in the cradle 20 charges a battery 3 in the music player 30.
(Typical Server)

In the currently used example, the server 10 includes a CPU 11. Its bus 12 is connected to a memory 13, which stores the programs to be executed by the CPU 11 and various data; a HDD (hard disk drive) 15, which contains a hard disk 14; a media drive 16, which drives a music CD (Compact Disc) or other disk 1 that is inserted into the server 10; a network interface (network I/F) 17 for connecting to an external network such as the Internet; and a USB (Universal Serial Bus) interface (USB I/F) 19 for connecting to the music player 30 via the cradle 20.

The bus 12 is also connected, for instance, to a display such as an LCD (Liquid Crystal Display), an operating control section containing a keyboard and a mouse, and an audio output section including a DAC (Digital to Analog Converter) and an audio amplifier circuit. However, these components are not shown in the figure.

The hard disk 14 not only stores programs and data, but also records music data (song data) that are acquired from a disk 1 or external network and compressed/encoded by an audio encoding method such as MP3 (MPEG-1 Audio Layer-3) or ATRAC3 (Adaptive Transform Acoustic Coding-3, registered trademark).
(Typical Music Player)

In the currently used example, the music player 30 includes a CPU 31. Its bus 32 is connected to a memory 33, which stores the programs to be executed by the CPU 31 and various data; a flash memory 34, which mainly stores compressed/encoded song data; a decoder 35 for decompressing/decoding the song data; and a USB interface (USB) 39 for connecting to the server 10 via the cradle 20. The output end of the decoder 35 is connected to an earphone 38 via an audio output section, which includes a DAC 36 and an audio amplifier circuit 37.

The bus 32 is also connected, for instance, to an LCD for displaying, for instance, the names of songs recorded in the flash memory 34 and an operating control section for switching, for instance, from one song name to another on the LCD and selecting the song to be played. However, these components are not shown in the figure.
(File Attached Information in the Server: FIG. 2)

As shown in FIG. 2, the hard disk 14 in the server 10 records the song name, artist name, length, size, server registration date/time, music player registration date/time, and transfer-to-music-player count of every file (compressed data file for each song) that is recorded on the hard disk 14.

The server registration date/time denotes the date/time at which a file was acquired from a disk 1 or external network, entered into the server 10, and recorded on the hard disk 14.

The music player registration date/time denotes the date/time at which a file was transferred from the server 10 to the music player 30 and recorded in the flash memory 34. The transfer-to-music-player count denotes the number of times a file was transferred from the server 10 to the music player 30 and recorded in the flash memory 34.

When a certain file (file G in FIG. 2) is transferred to the music player 30, recorded in the flash memory 34, and deleted from the flash memory 34 as described later, the transfer-to-music-player count remains unerased, but the music player registration date/time is erased. If the same file is later transferred to the music player 30 and recorded in the flash memory 34, the transfer-to-music-player count is incremented by one and the reregistration date/time is recorded as the music player registration date/time. Therefore, the music player registration date/time constantly represents the last registration date/time and indicates that the associated file is currently retained in the music player 30.

Files A to F are currently retained in the music player 30. Files H, I, and J have not been transferred to the music player 30 or recorded in the flash memory 34.

As described later, the CPU 11 of the server 10 references the server registration date/time, music player registration date/time, and transfer-to-music-player count to select the files (songs) to be downloaded into the music player 30.

(File Attached Information in the Music Player: FIG. 3)

As shown in FIG. 3, the flash memory 34 of the music player 30 records the song name, artist name, length, size, date/time of registration from server (music player registration date/time), substantial playback count Kp, and skip count Ks of every file that is recorded in the flash memory 34.

The term "substantial playback" denotes a continuous playback of a song for a duration not shorter than a predetermined one (e.g., for a duration not shorter than 10 seconds). The term "skip" denotes a playback of a song for a duration shorter than a predetermined one (e.g., for a duration shorter than 10 seconds). As described earlier, the term "skip" does not refer to a switch from one song name to another on the LCD of the music player 30, which is made to select the song to be played.

However, the predetermined duration for a substantial playback may be longer than the predetermined duration for a skip. For example, the substantial playback may represent a continuous playback of a song for a duration not shorter than 30 seconds, whereas the skip may represent a playback of a song for a duration shorter than 10 seconds.

When a user-selected song is played, the CPU 31 of the music player 30 judges whether the playback is a substantial playback or skip (an intermediate playback, which is neither a substantial playback nor a skip, may occur if, as described above, the predetermined duration for a substantial playback is longer than the predetermined duration for a skip), determines the substantial playback count Kp and skip count Ks, and records the counts in the flash memory 34 as a playback history.

The free space of the flash memory 34 is the size of an unoccupied song data recording area excluding an area where the information about songs is recorded as indicated in FIG. 3.

As described later, the CPU 31 of the music player 30 or the CPU 11 of the server 10 selects the files to be deleted from the flash memory 34 of the music player 30 in accordance with the above-mentioned substantial playback count Kp and skip count Ks when files selected by the server 10 are to be transferred.

[One Embodiment of a Music Data Transfer/Recording Method: FIGS. 4 to 7]

When the music player 30 of the music recording/playback system described above is placed on the cradle 20 while the server 10 and music player 30 are running, the music player 30 is connected to the server 10 so that the server 10 downloads files (song data) to the music player 30 as described below.

(Selecting the Song to be Transferred)

The CPU 11 of the server 10 references the server registration date/time, music player registration date/time, and transfer-to-music-player count of every file that is recorded on the hard disk 14, and preferentially selects a file that is recorded on the hard disk 14, is not retained in the music player 30, has not been transferred to the music player 30, and has been most recently registered in the server, as the file to be transferred to the music player 30.

In the examples shown in FIGS. 2 and 3, files H, I, and J are retained in the server 10. However, files H, I, and J are not retained in the music player 30 and have not been transferred to the music player 30. Among files H, I, and J, file J is most recently registered in the server. File G is not retained in the music player 30, but was previously transferred to the music player 30, recorded in the flash memory 34, and deleted from the flash memory 34 by performing a process that is described later. Files A to F are currently retained in the music player 30.

Consequently, when the timing is as indicated in the currently used example, file J is selected as the file to be transferred to the music player 30.

In the example shown in FIG. 2, however, the server registration date/time of file I is close to that of file J. When the difference between the server registration dates/times of a plurality of files is not greater than the predetermined time, such as one hour, the server side processing program may be configured so that such plurality of files (files J and I in the example shown in FIG. 2) are selected as the files to be transferred to the music player 30.

(Selecting the Song to be Deleted)

When the size (download size) of the file to be transferred from the server 10 to the music player 30 exceeds the free space of the flash memory 34, the CPU 31 of the music player 30 or the CPU 11 of the server 10 selects the file to be deleted from the flash memory 34 of the music player 30 in accordance with the substantial playback count Kp and skip count Ks shown in FIG. 3.

More specifically, a substantial playback is regarded as a plus evaluation factor for retaining the associated song, whereas a skip is regarded as a minus evaluation factor for deleting the associated song. When the values a and b are weighting coefficients, the following equation is obtained:

$$K = a \times Kp - b \times Ks \quad \text{Equation (1)}$$

The above is handled as an evaluation function. A song having a small evaluation function (e.g., a minus evaluation function) will be preferentially selected as the song to be deleted.

If, for instance, a=2 and b=1, the following equation is obtained:

$$K = 2Kp - Ks \quad \text{Equation (2)}$$

Further, when a song was frequently transferred to the music player, its substantial play count Kp is low or its skip count Ks is high. It means that the song was frequently deleted from the music player 30. It can therefore be estimated that the song does not match the user's preferences. Therefore, when the server 10 selects the song to be deleted from the music player 30, the server side processing program may be configured so as to handle the transfer-to-music-player count Kt as a minus evaluation factor for deleting the associated song as is the case with the skip count Ks, handle the value c as a weighting coefficient, handle $K = a \times Kp - b \times Ks - c \times Kt$ (Equation (3)) as an evaluation function, and preferentially select a song having a small evaluation function (e.g., a minus evaluation function) as the song to be deleted.

If, in this instance, a=2, b=1, and C=4, the following equation is obtained:

$$K = 2Kp - Ks - 4Kt \quad \text{Equation (4)}$$

When Equation (2) is used to determine the evaluation functions K for files A to F, which are retained in the music player 30 as indicated in the examples shown in FIGS. 2 and 3, the values outside the parentheses are obtained as indicated in FIG. 3. Thus, file C is selected as the file to be deleted. When Equation (4) is used to determine the evaluation functions K, the parenthesized values shown in FIG. 3 are obtained. Thus, file C is selected as the file to be deleted.

However, if the size of the free space of the flash memory 34 is added to the size of the file to be preferentially deleted as described above and the resultant size is smaller than the download size (the data size of the file to be transferred from the server 10), the music player side or server side processing program is configured so that the sum of the data size of the file to be deleted and the size of the free space of the flash memory 34 is not smaller than the download size, and that lower-priority files will be selected as the files to be deleted.

If two files are to be selected as the songs to be deleted while the examples shown in FIGS. 2 and 3 are used, files C and D are selected when Equation (2) is used to calculate the evaluation function K, and files B and C are selected when Equation (4) is used to calculate the evaluation function K.

Figure 4:
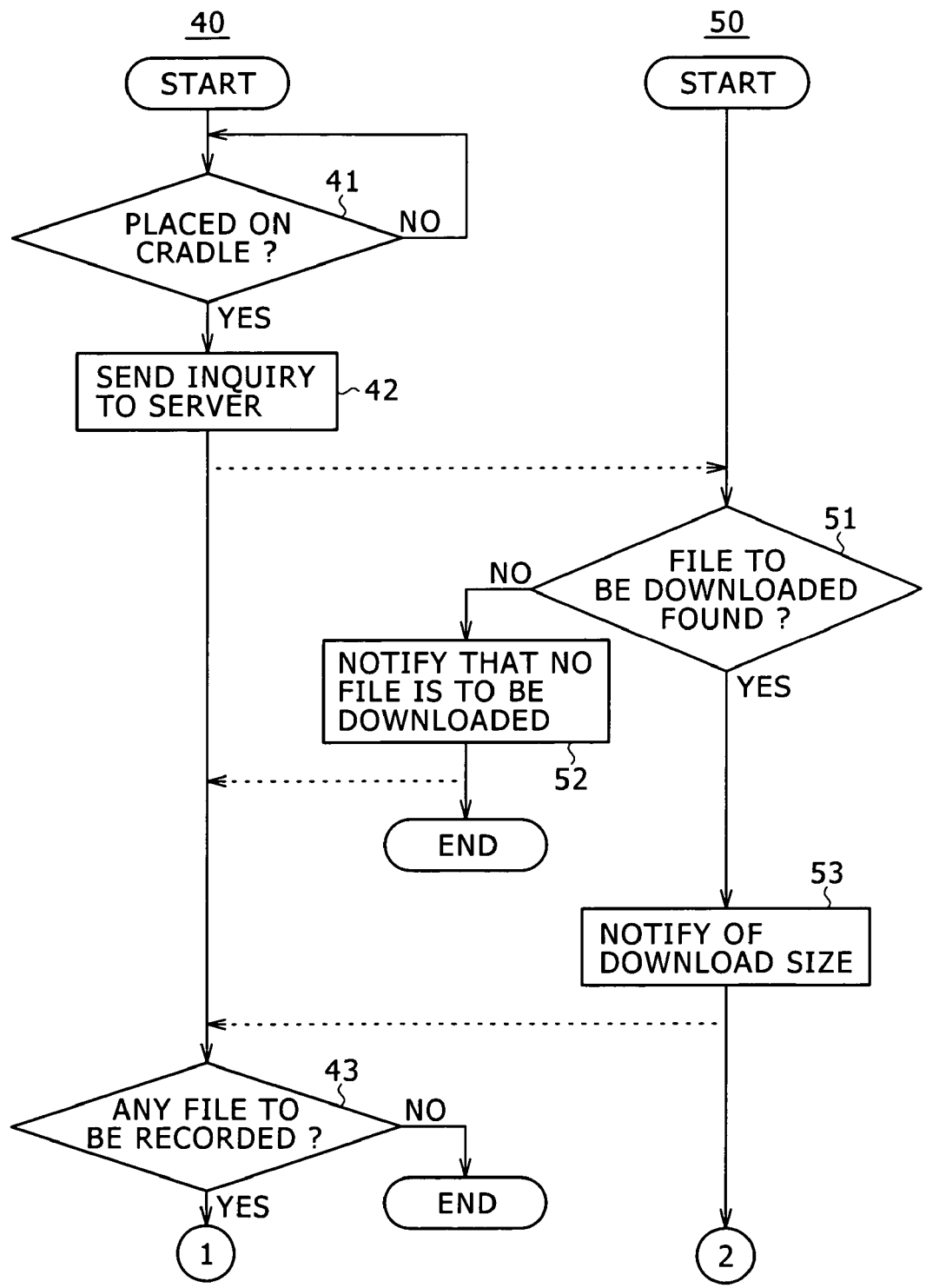
FIG. 4 shows a part of a first example of a music player side/server side processing program.
Figure 5:
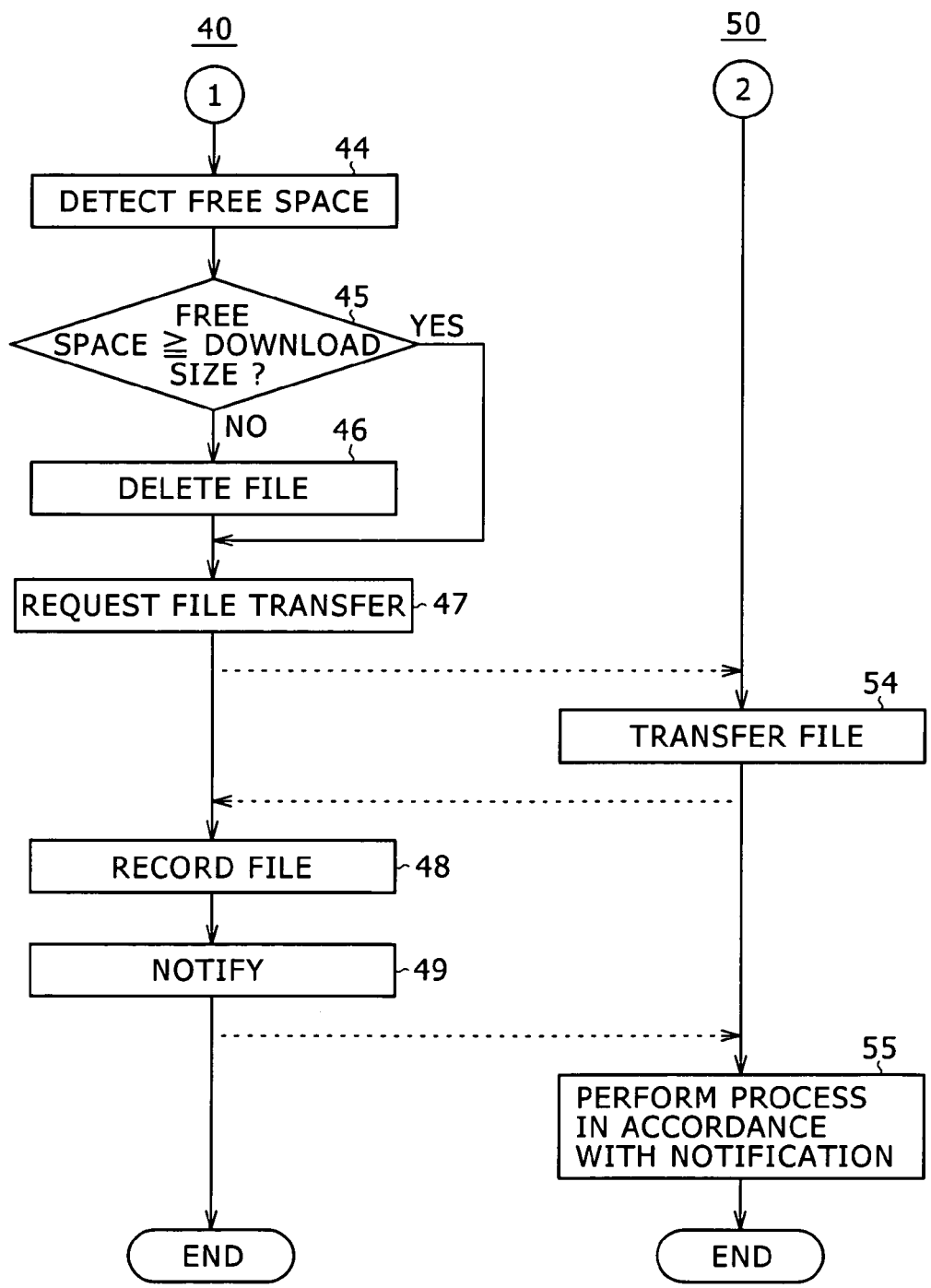
FIG. 5 shows the remaining part of the first example of the music player side/server side processing program.

(Process Performed When the Song to be Deleted is to be Selected on the Music Player Side: FIGS. 4 and 5)

FIGS. 4 and 5 show examples of processing programs that the CPU 31 of the music player 30 and the CPU 11 of the server 10 execute for allowing the music player 30 to select the song to be deleted.

Referring to FIGS. 4 and 5, the processing program 40 for the music player 30 first performs step 41 to judge whether the music player 30 is placed on the cradle 20. If the obtained judgment indicates that the music player 30 is placed on the cradle 20, the processing program 40 proceeds to step 42 and inquires of the server 10 whether the server 10 retains a file (song data) that is to be downloaded.

In response to the above inquiry, the processing program 50 for the server 10 performs step 51 in which the aforementioned judgment standard is used to judge whether the file to be downloaded into the music player 30 is retained in the server 10. If the file to be downloaded is not found in the server 10, the processing program 50 proceeds to step 52 and notifies the music player 30 that the file to be downloaded is not found. If, on the other hand, the file to be downloaded is found, the processing program 50 proceeds to step 53 and notifies the music player 30 of a download size.

After completion of step 42, the music player 30 proceeds to step 43. In step 43, the music player 30 notes the notification from the server 10 to judge whether the file to be recorded in the flash memory 34 is available. If the file to be recorded is not available, the music player 30 immediately terminates the process. If, on the other hand, the file to be recorded is available, the music player 30 proceeds to step 44 and detects the free space of the flash memory 34. The music player 30 further proceeds to step 45 and judges whether the free space is not smaller than the download size.

If the free space is smaller than the download size, the music player 30 proceeds from step 45 to step 46, selects the file to be deleted in a manner described earlier, and deletes the file from the flash memory 34. The music player 30 then proceeds to step 47. If, on the other hand, the free space is not smaller than the download size, the music player 30 jumps from step 45 to step 47 without deleting any file from the flash memory 34.

In step 47, the music player 30 sends a file transfer request to the server 10. In response to the request, the server 10 performs step 54, which follows step 53, to transfer the file selected in step 51 to the music player 30. The music player 30 then performs step 48, which follows step 47, to record the transferred file in the flash memory 34.

The music player 30 further proceeds to step 49. If a file was deleted in step 46, the music player 30 sends a notification and the file identification information about the deleted file to the server 10 to indicate that the file was deleted. If no file was deleted in step 46, on the other hand, the music player 30 sends a notification to the server 10 to indicate that no file was deleted. The server 10 then proceeds to step 55, which follows step 54, and performs a process in accordance with the notification from the music player 30.

If a file is deleted by the music player 30, the server 10 deletes the music player registration date/time of the deleted file. This causes the server 10 to recognize that the file is no longer retained in the music player 30.

The above example indicates that a song in the music player 30 can be naturally replaced by another song in the server 10 in accordance with the user's estimated preferences and wishes and without requiring the user to perform a special procedure, exercise judgment, or become conscious of individual songs.

The example shown in FIGS. 4 and 5 relates to a case where the file to be downloaded is available and the server 10 transfers the file to the music player 30 in compliance with a request from the music player 30 after notifying the music player 30 of the download size. The processing program may be configured so that the server 10 transfers the file to the music player 30 at the time of download size notification, and that the music player 30 temporarily stores the file in the memory 33, and further that, if any file is to be deleted from the flash memory 34, the file temporarily stored in the memory 33 is recorded in the flash memory 34 after deletion of the file to be deleted.

Figure 6:
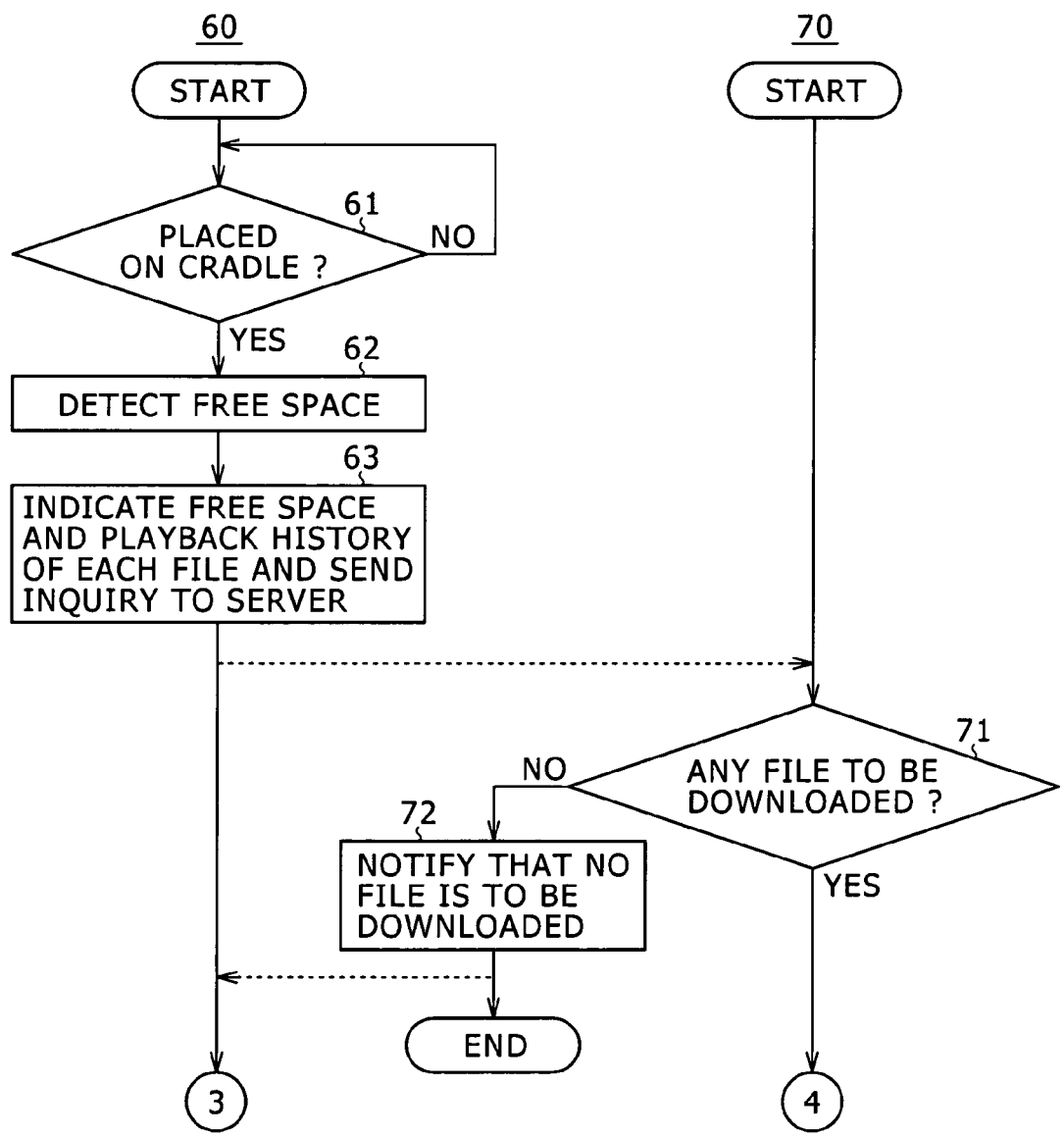
FIG. 6 shows a part of a second example of a music player side/server side processing program.
Figure 7:
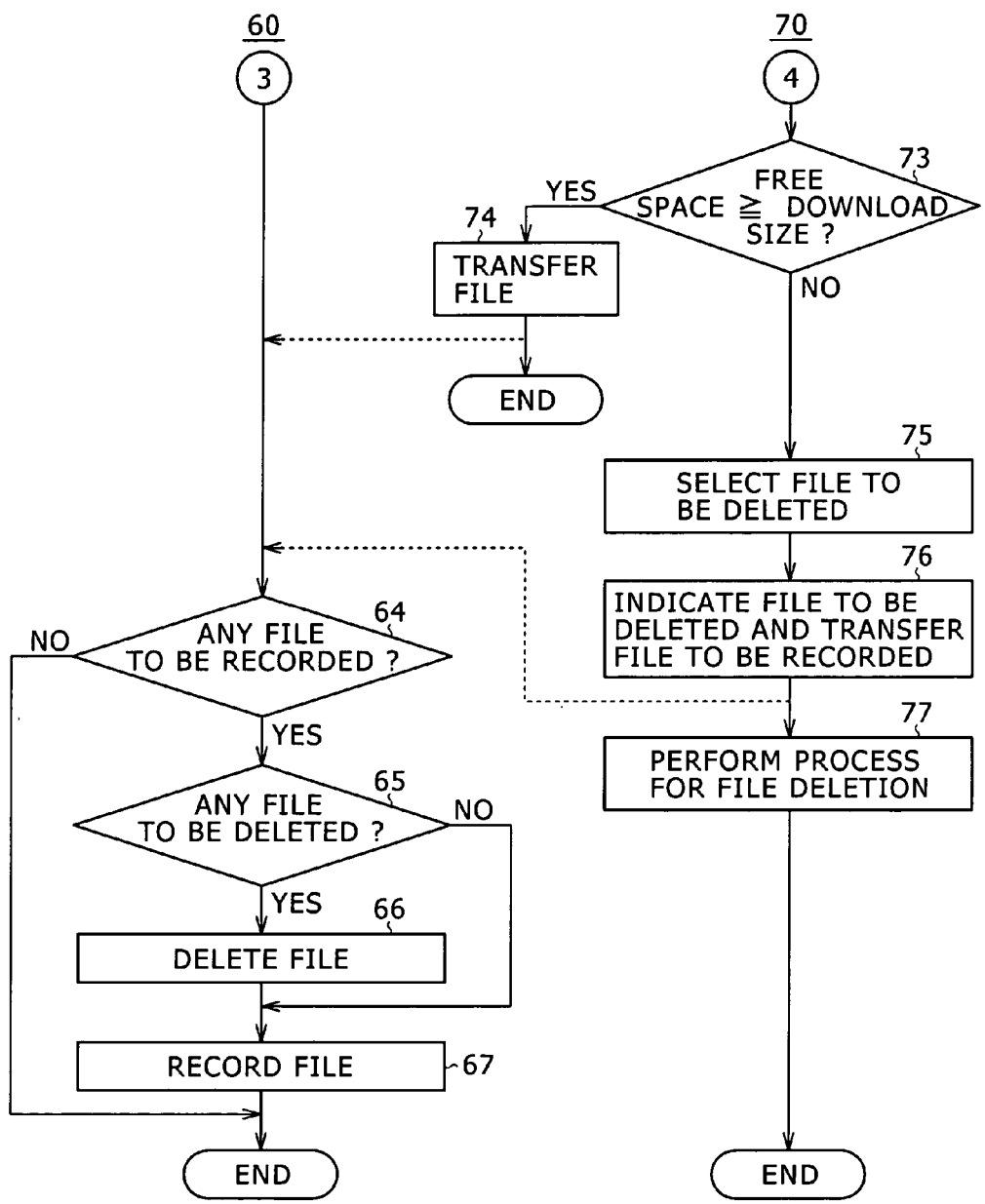
FIG. 7 shows the remaining part of the second example of the music player side/server side processing program.

(Process Performed When the Song to be Deleted is to be Selected on the Server Side: FIGS. 6 and 7)

FIGS. 6 and 7 show examples of processing programs that the CPU 31 of the music player 30 and the CPU 11 of the server 10 execute for allowing the server 10 to select the song to be deleted.

Referring to FIGS. 6 and 7, the processing program 60 for the music player 30 first performs step 61 to judge whether the music player 30 is placed on the cradle 20. If the obtained judgment indicates that the music player 30 is placed on the cradle 20, the processing program 60 proceeds to step 62 and detects the free space of the flash memory 34. Further, the processing program 60 proceeds to step 63, indicates the free space and the playback history (substantial playback count Kp and skip count Ks) of every file that is recorded in the flash memory 34, and inquires of the server 10 whether the server 10 retains a file that is to be downloaded.

In response to the above inquiry, the processing program 70 for the server 10 performs step 71 in which the aforementioned judgment standard is used to judge whether the file to be downloaded into the music player 30 is retained in the server 10. If the file to be downloaded is not found in the server 10, the processing program 70 proceeds to step 72 and notifies the music player 30 that the file to be downloaded is not found. If, on the other hand, the file to be downloaded is found, the processing program 70 proceeds to step 73 and judges whether the free space indicated by the music player 30 is not smaller than the download size.

If the free space is not smaller than the download size, the server 10 proceeds from step 73 to step 74 and transfers the file to be recorded, which was selected in step 71, to the music player 30.

If, on the other hand, the free space is smaller than the download size, the server 10 proceeds from step 73 to step 75, uses Equation (2) or (4) to calculate the evaluation function K for every file recording in the flash memory 34 of the music player 30 in accordance with the substantial playback count Kp and skip count Ks indicated by the music player 30, and selects the file to be deleted in a manner described earlier. Further, the server 10 proceeds to step 76, notifies the music player 30 of the file to be deleted, and transfers the file to be recorded, which was selected in step 71.

After completion of step 63, the music player 30 proceeds to step 64 and judges whether any file is to be recorded in the flash memory 34. If, in step 72, the music player 30 is notified that no file is to be downloaded from the server 10, the process terminates immediately.

If, in step 74 or 76, the file to be recorded is transferred from the server 10, the music player 30 proceeds from step 64 to step 65 and judges whether any file is to be deleted from the flash memory 34.

If, in step 76, the file to be deleted is specified by the server 10, the music player 30 proceeds from step 65 to step 66, deletes the specified file from the flash memory 34, and then proceeds to step 67. If, in step 74, the server 10 did not specify the file to be deleted, the music player 30 jumps from step 65 to step 67 without deleting a file from the flash memory 34.

In step 67, the music player 30 records in the flash memory 34 the file transferred from the server 10 in step 74 or 76. Meanwhile, the server 10 proceeds to step 77 after completion of step 76. In step 77, the server 10 deletes the music player registration date/time of the file to be deleted from the music player 30.

In the above example, too, a song in the music player 30 can be replaced by another song in the server 10 in accordance with the user's estimated preferences and wishes and without requiring the user to perform a special procedure, exercise judgment, or become conscious of individual songs.

The example shown in FIGS. 6 and 7 relates to a case where the music player 30 indicates the free space of the flash memory 34 to the server 10. However, the server 10 can determine the total data size of the song data recorded in the flash memory 34. Therefore, if the total size of the song data recording area of the flash memory 34 is known, the server 10 can calculate the free space of the flash memory 34. Thus, the music player 30 does not have to indicate the free space of the flash memory 34 to the server 10.

The example shown in FIGS. 6 and 7 relates to a case where the music player 30 initially indicates the playback history (substantial playback count Kp and skip count Ks) of every file recording in the flash memory 34 to the server 10. However, the processing program may alternatively be configured so that the playback history of every file recording in the flash memory 34 is transmitted from the music player 30 to the server 10 in compliance with a request from the server 10 when the server 10 judges that the free space of the flash memory 34 is smaller than the download size.

Other Embodiments

When selecting the song to be deleted, the foregoing embodiment considers both the substantial playback count Kp and skip count Ks. Alternatively, however, the song to be deleted may be selected while considering either the substantial playback count Kp or the skip count Ks.

The foregoing embodiment is configured so that a download is performed when the music player 30 is placed on the cradle 20. Alternatively, however, a download may be performed when, for instance, the schedules of the music player 30 and server 10 are synchronized with each other.

The storage section of the music player does not always have to be a flash memory. The storage device of the server does not always have to be a hard disk.

INDUSTRIAL APPLICABILITY

As described above, the present invention makes it possible to replace a song in the music player 30 by another song in the server 10 naturally in accordance with the user's estimated preferences and wishes and without requiring the user to perform a special procedure, exercise judgment, or become conscious of individual songs.

FIG. 1
14: Hard disk
13: Memory
16: Media drive
19: USB I/F
17: Network I/F
2: Charger circuit
39: USB interface
3: Battery
33: Memory
34: Flash memory
35: Decoder
FIG. 2
File identification information
Song name
Artist name
Length
Size
Server registration date/time
Music player registration date/time
Transfer-to-music-player count
FIG. 3
File identification information
Song name
Artist name
Length
Size
Date/time of registration from server
Substantial playback count Kp
Skip count Ks
Evaluation function K
FIG. 4
40: START
50: START
41: Placed on cradle?
42: Send inquiry to server
51: File to be downloaded found?
52: Notify that no file is to be downloaded
END
53: Notify of download size
43: Any file to be recorded?
END
FIG. 5
44: Detect free space
45: Free space≧download size?
46: Delete file
47: Request file transfer
54: Transfer file
48: Record file
49: Notify
55: Perform process in accordance with notification
END
END
FIG. 6
60: START
70: START
61: Placed on cradle?
62: Detect free space
63: Indicate free space and playback history of each file and send inquiry to server
71: Any file to be downloaded?
72: Notify that no file is to be downloaded
END
FIG. 7
73: Free space≧download size?
74: Transfer file
END
75: Select file to be deleted
76: Indicate file to be deleted and transfer file to be recorded

64: Any file to be recorded?
65: Any file to be deleted?
77: Perform process for file deletion
66: Delete file
67: Record file
END
END

The invention claimed is:

1. A music data transfer/recording method for transferring song data from a server, which retains song data in a storage device, to a music player, which plays back song data retained in a storage section, and writing the transferred song data in the storage section, the method comprising:

a first step for causing the server to select the song data to be transferred to the music player from among the song data that are retained in the storage device and not retained in the storage section;

a second step for causing the music player to judge whether the free space in the storage section is exceeded by the amount of song data to be transferred; and a third step for causing the music player, when the free space in the storage section is exceeded by the amount of song data to be transferred, to select the song data to be deleted from the storage section, delete the selected song data from the storage section, and write the song data transferred from the server into the storage section, wherein the first step causes the server to select song data that has not been transferred to the music player and has been most recently registered in the server, as the song data to be transferred to the music player; and wherein the third step causes the music player to reference a continuous playback count of each song data retained in the storage section, the continuous playback count denoting the number of times a song was continuously played for a duration not shorter than a predetermined one, or a skip count of each song data retained in the storage section, the skip count denoting the number of times a song was played for a duration shorter than a predetermined one, and select the song data having a low continuous playback count or the song data having a high skip count as the song data to be deleted from the storage section.

2. A music data transfer/recording method for transferring song data from a server, which retains song data in a storage device, to a music player, which plays back song data retained in a storage section, and writing the transferred song data in the storage section, the method comprising:

a first step for transmitting a continuous playback count, which denotes the number of times a song was continuously played for a duration not shorter than a predetermined one, or a skip count, which denotes the number of times a song was played for a duration shorter than a predetermined one, from the music player to the server as a playback history of each song data retained in the storage section;

a second step for causing the server to select the song data to be transferred to the music player from among the song data that are retained in the storage device and not retained in the storage section, and to judge whether the free space in the storage section is exceeded by the amount of song data to be transferred;

a third step for causing the server, when the free space in the storage section is exceeded by the amount of song data to be transferred, to select the song data to be deleted from the storage section, specify the song data to be deleted, and transfer the song data targeted for a transfer to the music player; and a fourth step for causing the music player to delete the specified song data from the storage section and write the transferred song data into the storage section, wherein the second step causes the server to select song data that has not been transferred to the music player and has been most recently registered in the server, as the song data to be transferred to the music player; and wherein the third step causes the server to reference the playback history transmitted from the music player and select the song data having a low continuous playback count or the song data having a high skip count as the song data to be deleted from the storage section.

3. A music player comprising:

means for retaining song data;

means for playing back the song data retained by the means for retaining;

means for communicating with a server that retains song data in a storage device and receiving song data that is transferred from the server; and means for judging whether a free space in the means for retaining is exceeded by the amount of song data to transferred from the server, and when the free space is exceeded, selects the song data to be deleted from the means for retaining, deletes the selected song data from the means for retaining, and writes the song data transferred from the server in the storage means for retaining, wherein the means for judging references a continuous playback count of each song data retained in the means for retaining, the continuous playback count denoting the number of times a song was continuously played for a duration not shorter than a predetermined one, or a skip count of each song data retained in the means for retaining, the skip count denoting the number of times a song was played for a duration shorter than a predetermined one, and selects the song data having a low continuous playback count or the song data having a high skip count as the song data to be deleted from the means for retaining.

4. A music player comprising:

means for retaining song data;

means for playing back the song data retained by the means for retaining;

means for communicating with a server, which retains song data in a storage device, transmitting to the server a continuous playback count, which denotes the number of times a song was continuously played for a duration not shorter than a predetermined one, or a skip count, which denotes the number of times a song was played for a duration shorter than a predetermined one, as a playback history of each song data retained in the means for retaining, and receiving a signal indicating the song data to be deleted, which is transmitted from the server, and the song data transferred from the server; and means for deleting the song data to be deleted, which is designated by the server, from the means for retaining, and writing the song data transferred from the server into the means for retaining.

* * * * *